US010483857B1

(12) United States Patent
Yao et al.

(10) Patent No.: US 10,483,857 B1
(45) Date of Patent: Nov. 19, 2019

(54) FLYBACK CONVERTER WITH OUTPUT VOLTAGE CALIBRATION

(71) Applicant: DIALOG SEMICONDUCTOR INC., Campbell, CA (US)

(72) Inventors: Jianming Yao, Campbell, CA (US); Kai-Wen Chin, Campbell, CA (US); David Nguyen, Campbell, CA (US); Tao Li, Campbell, CA (US)

(73) Assignee: DIALOG SEMICONDUCTOR INC., Campbell, CA (US)

(*) Notice: Subject to any disclaimer, the term of this patent is extended or adjusted under 35 U.S.C. 154(b) by 0 days.

(21) Appl. No.: 16/215,469

(22) Filed: Dec. 10, 2018

(51) Int. Cl.
*H02M 3/335* (2006.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 3/335* (2013.01); *H02M 2001/0025* (2013.01)

(58) Field of Classification Search
CPC ......... H02M 3/33538; H02M 3/33546; H02M 33/33515; H02M 33/33576; H02M 33/33553; H02M 33/33507; H02M 33/33592; H02M 33/33523; H02M 33/3353; H02M 33/33569; H02M 3/156; H02M 3/158; H02M 3/1588; H02M 3/155; H02M 3/1582; H02M 3/157; H02M 3/1563
See application file for complete search history.

(56) References Cited

U.S. PATENT DOCUMENTS

2012/0008345 A1* 1/2012 Tang ................. H02M 3/33515
363/21.15
2012/0039098 A1* 2/2012 Berghegger ...... H02M 3/33507
363/21.13

* cited by examiner

*Primary Examiner* — Yusef A Ahmed
*Assistant Examiner* — Bryan R Perez
(74) *Attorney, Agent, or Firm* — Haynes and Boone, LLP

(57) ABSTRACT

An output voltage calibration circuit and technique is disclosed to increase the accuracy and precision of the constant-voltage mode for a flyback converter.

15 Claims, 5 Drawing Sheets

FLYBACK CONVERTER WITH OUTPUT VOLTAGE CALIBRATION

TECHNICAL FIELD

This application relates to flyback converters, and more particularly to a flyback converter with output voltage calibration.

BACKGROUND

The charging of a battery for a battery-powered device occurs through various constant-voltage or constant-current modes depending upon the state of the battery charge. As implied by the name, the charging voltage stays constant at some fixed level during a constant-voltage mode whereas the charging current may vary. Conversely, the charging current stays constant during a constant-current mode whereas the charging voltage may vary. The proper sequencing and control of the constant-voltage and constant-current modes is vital with regard to battery longevity. For example, a smartphone's battery is often integrated and non-removable. If the battery for such a device is damaged, the entire smartphone must be replaced. It is thus conventional for a mobile device to include a battery management circuit that controls the charging voltage and charging current for the battery.

Since the battery management circuit within the mobile device is controlling the charging voltage and charging current applied to the battery, the tolerances for the switching power converter supplying power to the mobile device are relaxed. An example charging system is shown in FIG. 1. A switching power converter such as a flyback converter 100 converts an input voltage into a regulated output voltage V_out during a constant-voltage mode of operation. A battery-powered device such as a smartphone 105 includes a battery management circuit 110 that controls the constant-voltage or constant-current charging applied to a battery for powering a system 115 using the output power from flyback converter 100. For example, in a constant-voltage mode, battery management circuit 110 regulates the constant output voltage from flyback converter 100 into a constant charging voltage for the battery. Similarly, in a constant-current mode, battery management circuit 110 regulates the constant output current from flyback converter 100 into a constant charging current for the battery. This regulation by battery management circuit 100 provides some tolerance for the regulation in flyback converter 100.

For example, the output voltage and output current tolerance for flyback converter 100 may be +/−5% as shown in FIG. 2 for the constant-voltage and constant-current modes of operation. For a desired constant-voltage mode of 5 V, the 5% tolerance means that output voltage can actually range from 4.75 V to 5.25V. To maintain regulation during constant-voltage operation, a primary-side controller (not illustrated) in flyback converter 100 needs some means of sensing the output voltage. In a primary-only-feedback configuration, the output voltage may be sensed through an auxiliary winding (or through the primary winding). As also shown in FIG. 2, an analogous tolerance range occurs for the output current during the constant-current mode of operation.

Such indirect sensing of the output voltage is adequate if the output voltage tolerance is fairly large such as shown in FIG. 2. But portable devices have been developed i which battery management circuit 100 is either absent or bypassed in what is denoted herein as direct-charge system. In a direct-charge system, the power converter itself is directly charging the portable device's battery. But note that modem smartphones typically have the battery non-removably integrated into the phone so that if the battery is defective, the entire smartphone becomes defective. This is especially problematic given the high cost of modern smartphones. It is thus critical that a power converter such as flyback converter 100 regulate the constant-voltage and constant-current modes with considerable precision so that the health of the mobile device's battery is preserved. The tolerance for these operating modes is thus reduced in direct-charge systems (e.g., +/−1% of the desired constant current or constant voltage). Despite this reduced tolerance, note that there is a substantial tolerance on the component parameters used to indirectly sense the output voltage. In addition, the indirectly-sensed output voltage is then compared to a reference voltage in primary-only feedback systems. The setting of the reference voltage also affects the accuracy of the output voltage regulation. It is thus problematic for primary-side-regulation of the output current voltage IQ achieve the necessary tolerance during constant-voltage operation.

There is thus a need in the art for flyback converters having improved primary-side regulation of the output voltage during constant-voltage operation.

SUMMARY

A flyback converter for direct-charge applications is provided with a secondary-side output voltage calibration circuit. This calibration circuit senses the output voltage so that the reference voltage used in constant-voltage modes of operation may be adjusted responsive to the sensed output voltage. But this sensing of the output voltage is done relatively infrequently as compared to the power switch cycling frequency so that stability of the control loop for the constant-voltage operation is not affected by the reference voltage calibration.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for improved primary-side regulation of the output voltage during constant-voltage operation, a secondary-side calibration technique is introduced. This calibration is relatively low frequency and thus does not disrupt or alter the loop stability for the primary-side regulation. To perform the calibration, a secondary-side calibration circuit is provided that directly measures the output voltage under known operating conditions. For example, it is conventional for charging over data cables such as over USB cables that the flyback converter includes a transistor output switch that disconnects the flyback converter from the power lead in the USB cable. This switch may thus be switched off during calibration so that there are no unknown load issues affecting the output voltage regulation. During the calibration, a known resistive load is applied as the load while the flyback converter is isolated from any other loads through the switched-off transistor output switch. Although the calibration may be performed without the use of such a known load, its use provides a more stable and accurate calibration as compared to a no-load condition.

Figure 1:
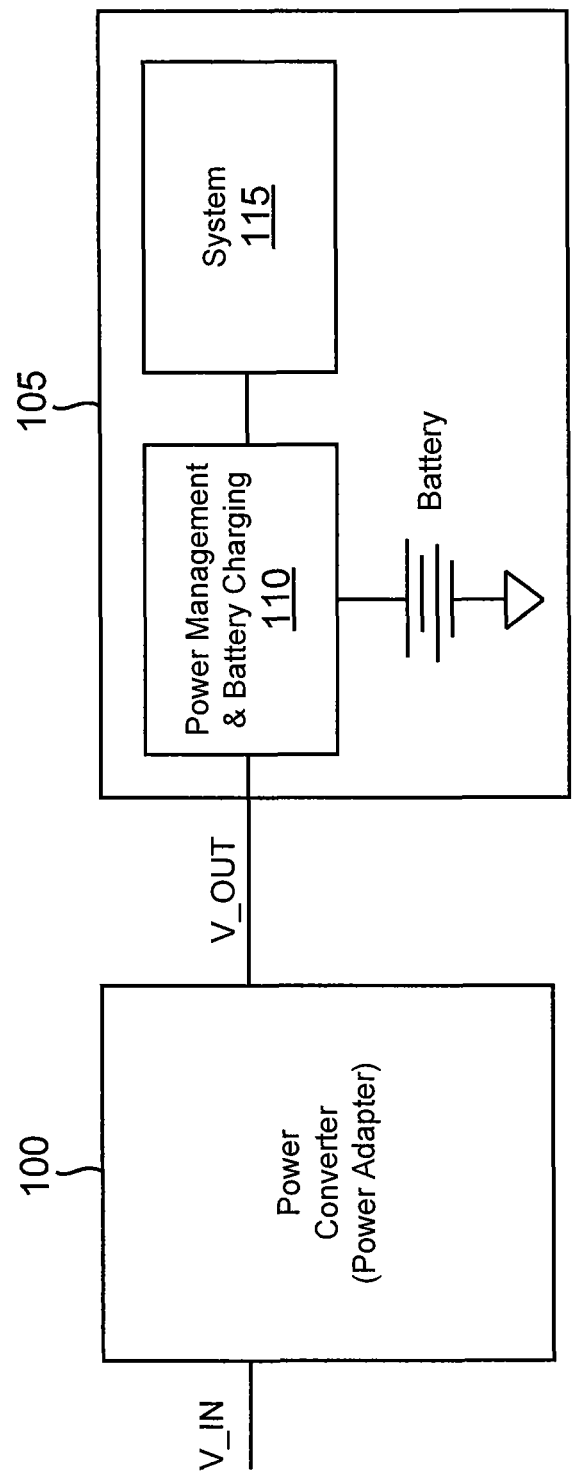
FIG. 1 is a diagram of a conventional mobile device charging system in which the mobile device includes a power management circuit.
Figure 2:
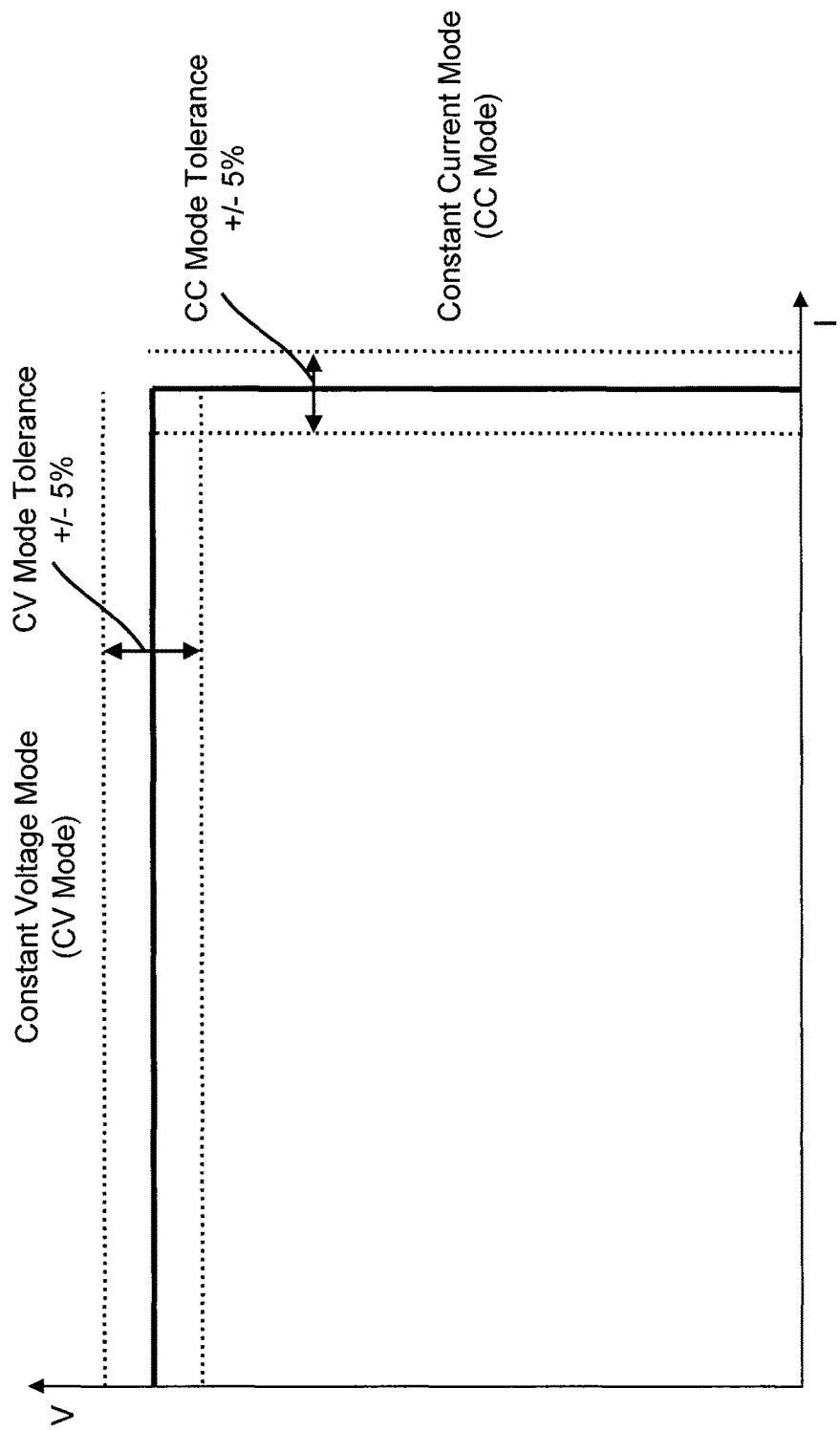
FIG. 2 is a plot showing the increased tolerance due to the mobile device's power management circuit for the constant-voltage and constant-current modes of operation in the power converter in system of FIG. 1.
Figure 3A:
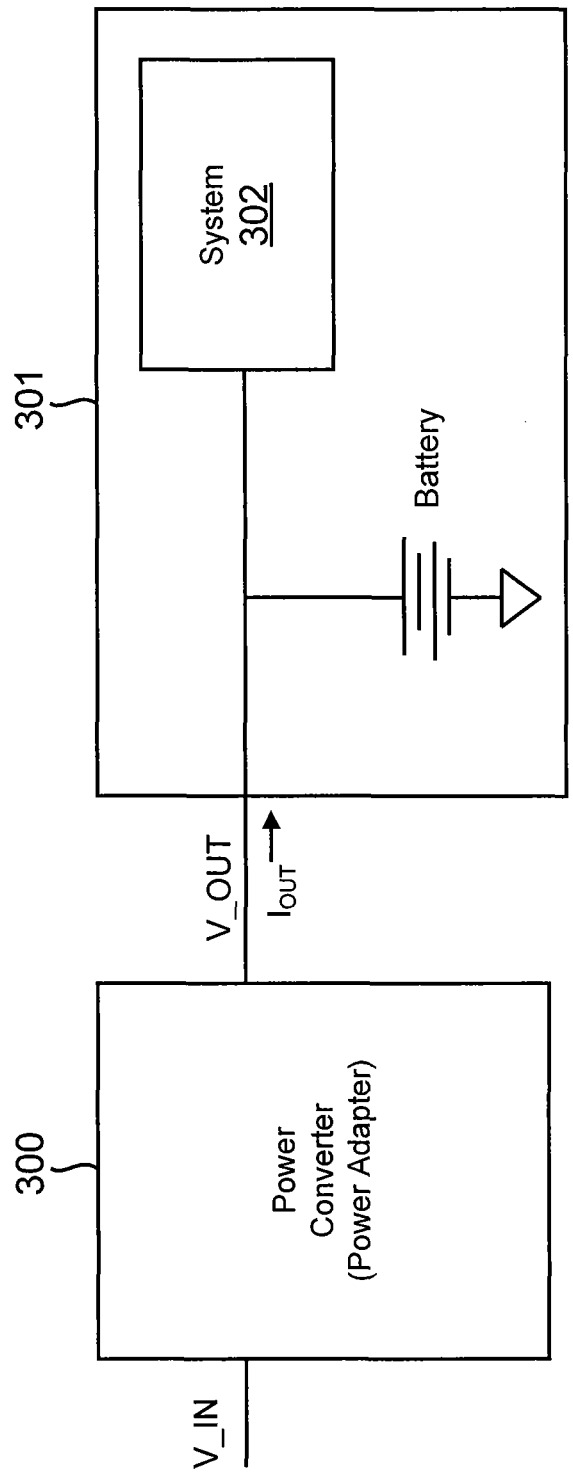
FIG. 3A is a diagram of a direct-charge system in which a mobile device does not include a power management circuit and in which a flyback converter includes a secondary-side output voltage calibration circuit in accordance with an aspect of the disclosure.
Figure 3B:
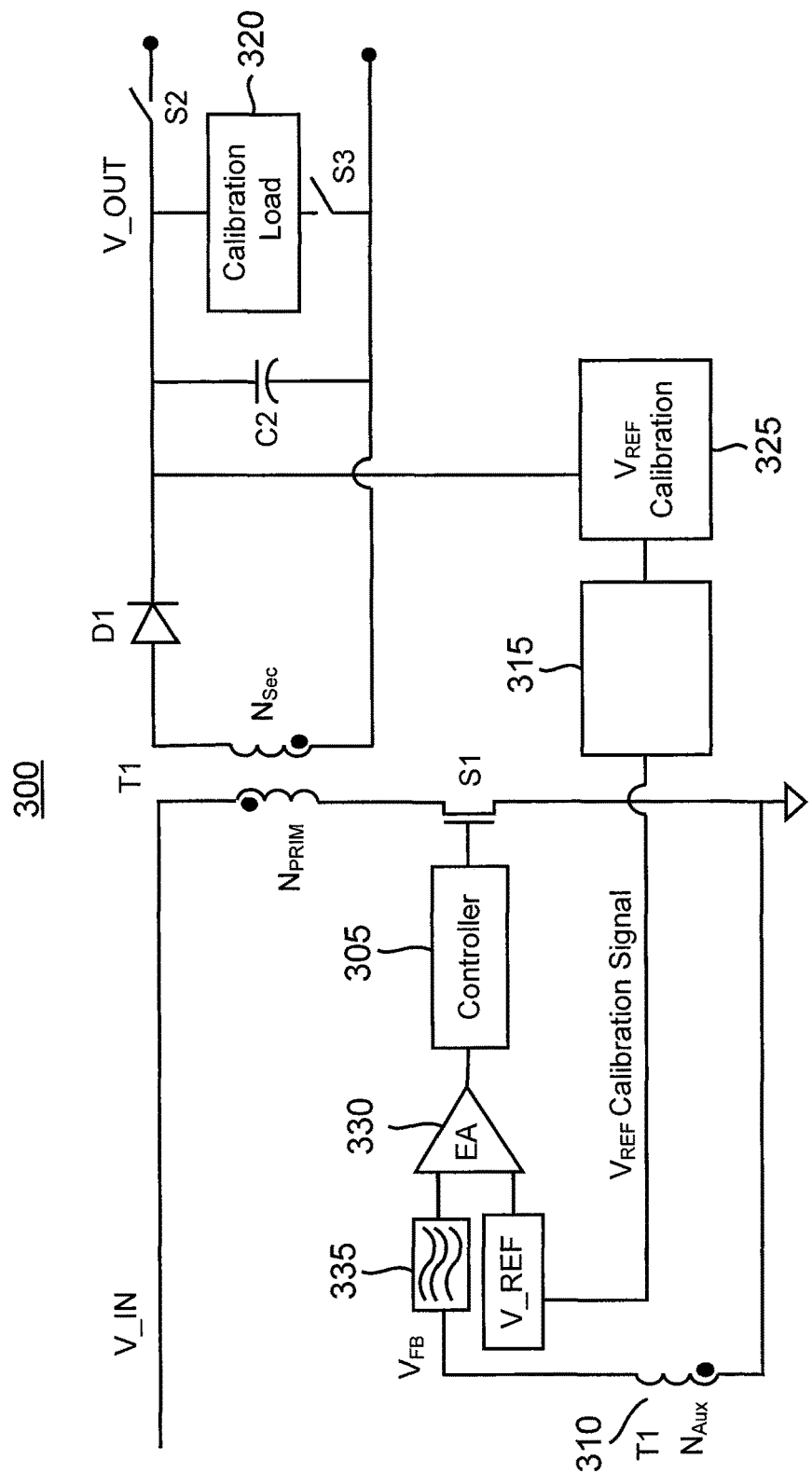
FIG. 3B is a block diagram for the flyback converter of FIG. 3A.

An example flyback converter 300 with a secondary-side calibration circuit for calibration of the constant-voltage modes of operation is shown in FIG. 3A. The precision provided by the secondary-side output voltage calibration enables flyback converter 300 to safely directly charge a battery for powering a system 302 in a mobile device 301. In this direct-charge configuration, there is no power management circuit that controls the charging of the battery in mobile device 301. Instead, it is flyback converter 300 that must regulate the constant-voltage and constant-current charging modes for the battery. Flyback converter 300 is shown in more detail in FIG. 3B. A primary-side controller 305 controls the switching of a power switch transistor S1 to regulate operation in either a constant-voltage or a constant-current mode of operation. During constant-voltage regulation, controller 305 samples an output voltage Vout indirectly by sampling a feedback voltage (VFB) on an auxiliary winding 310 of a transformer T1. The feedback voltage is filtered in a loop filter 335 and compared to a reference voltage ($V_{\_REF}$) at an error amplifier 330 to produce an error voltage. Depending upon the error voltage, controller 305 adjusts the modulation of the cycling of a power switch transistor S1 such as through pulse-width modulation or pulse frequency modulation to keep the output voltage at the desired level during constant-voltage operation.

When power switch transistor S1 cycles on, an input voltage V_IN causes a magnetizing current to flow through the primary winding of the transformer T1. While the power switch transistor S1 is conducting, an output diode D1 prevents a secondary current from flowing in a secondary winding of transformer T1. Alternatively, the secondary current may be controlled by a synchronous rectifier switch as known in the synchronous rectification arts. When the power switch transistor S1 cycles off, the secondary current flows to charge an output capacitor C2 with the output voltage (V_OUT). During normal operation (no calibration being performed), a switch S3 is opened to prevent a calibration load 320 (e.g., a resistor) from discharging current. In addition, an output switch S2 is closed during normal operation so that flyback converter may drive the load (e.g., a mobile device that is not illustrated).

At a predefined condition such as startup or in response to a threshold temperature change, the output voltage is measured by an output calibration circuit 325. Based upon the measured output voltage, calibration circuit 325 adjust the reference voltage that is compared to the feedback voltage in error amplifier 330. But calibration circuit 325 is on the secondary side of transformer T1 and thus cannot directly communicate the new value for the reference voltage to the primary side of flyback converter 300. Instead, the reference voltage command is driven through a ground-isolating channel 315 such as an optoisolator. Alternatively, a capacitor or the transformer T1 itself may be used to form ground-isolating channel 315. Should the calibration indicate that the output voltage is too low as compared to the desired output voltage, calibration circuit 325 would increase the reference voltage. Conversely, if the output voltage is too high as compared to the desired output voltage, calibration circuit 325 lowers the reference voltage.

With regard to setting the desired output voltage, this setting may be negotiated between the flyback converter and the load such as performed in a quick charge system. A data cable such as a USB cable can only conduct so much current to the load. If the output voltage is kept at a default level such as 5 V, the charging of a relatively large capacity battery may then take too long to satisfy a user's expectations. But in a quick charge system, the output voltage may be raised (e.g., from 5V to 9V, or from 5V to 12 V, and so on) from the default level so that charging may be performed more quickly. Regardless of whether the desired output voltage is a default level or an increased level, calibration circuit 325 adjusts the reference voltage accordingly.

The reference voltage command is received at error amplifier 330 after passing through ground-isolating channel 315. Since this command is digital, controller 305 merely needs an interface (not illustrated) to receive and decode the digital command for the reference voltage. Since such interfaces are known in the fly converter arts with regard to transmitting information across channel 315, the interface will not be discussed further. The sensing of the output voltage through primary-only feedback is performed by sensing the reflected voltage on auxiliary winding 310 at the transformer reset time. After filtering in filter 335 (or prior to the filtering), the feedback voltage is digitized to also be received at error amplifier 330. Error amplifier 330 is thus implemented in the digital domain and is shown separately from controller 305 for illustration purposes. In alternative embodiments, the error amplification may be performed in the analog domain. In such embodiments, the reference voltage command would need to be converted into an analog reference voltage in a digital-to-analog converter (DAC).

Figure 4:
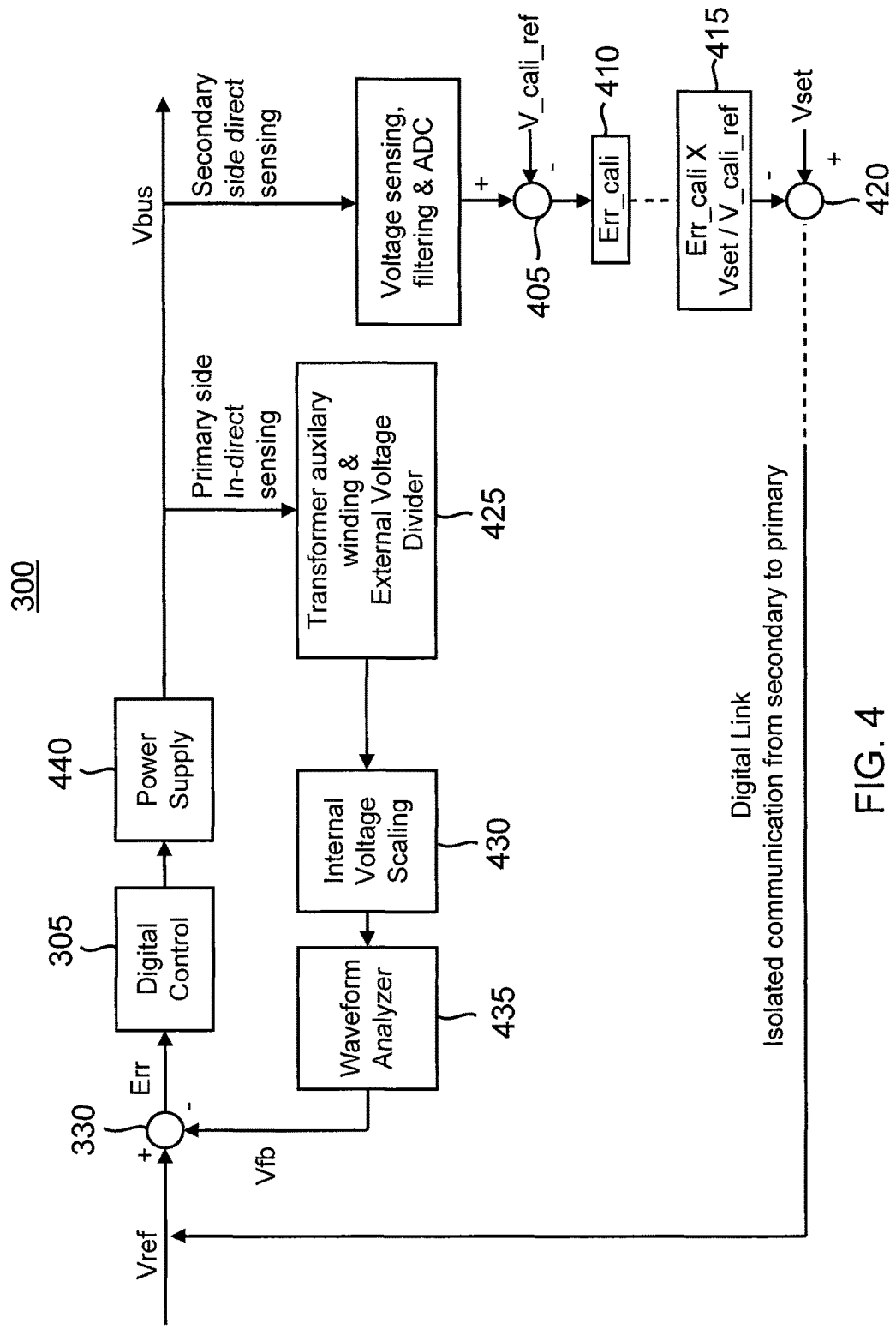
FIG. 4 is a more detailed view of constant-voltage calibration for the flyback converter of FIG. 3B.

The resulting constant-voltage feedback loop for flyback converter 300 is shown in more detail in FIG. 4. The output voltage sensing and resulting adjustment of the reference voltage is performed relatively infrequently as discussed above so that the stability of the feedback loop is not affected by the output voltage calibration. Voltage calibration circuit 325 senses the output voltage and converts it into a digital version of the output voltage in an analog-to-digital converter as also discussed previously. To form the digital command for the reference voltage, a first adder 405 forms the difference between the digital version of the output voltage and a default calibration reference (V_cali_ref). This default calibration reference is a digital version of the default output voltage such as the 5 V discussed earlier. The difference from first adder 405 is denoted as a calibration error (Err_cali) 410. This calibration error is stored in a memory (not illustrated) since it will be used repeatedly until the next calibration cycle. The desired output voltage for the constant-voltage mode of operation is denoted herein as Vset. This desired value may equal the default value or it may be greater than the default value in quick charge embodiments. To map the calibration error to the desired output voltage, calibration error 410 is multiplied by a ratio of Vset to the default calibration reference in a multiplier 415. If Vset is the same as the default calibration reference (no increased output voltage in a quick charge embodiment), then multiplier 415 leaves calibration error 410 unchanged. But if Vset is greater than the default calibration reference due to a quick charge mode of operation demanding an increase from the default output voltage, then multiplier 410 increases the calibration error accordingly.

The revised calibration error from multiplier 415 is then subtracted from Vset in a second adder 420 to form the reference voltage command. An interface (not illustrated) then drives the reference voltage command over channel 315 so that the digital reference voltage (Vref) may be recovered on the primary side of flyback converter 300. To sense the output voltage through primary-only feedback, the auxiliary winding voltage is sensed through, for example, a voltage divider 425. The primary winding voltage may instead be sensed in alternative embodiments. After voltage scaling 430 and waveform analysis 435 to locate the transformer reset sampling time, the resulting feedback voltage Vfb is subtracted from the reference voltage at error amplifier 330 to form an error signal used by controller 305 to modulate the cycling of the power switch transistor (represented as power supply 440).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A circuit for a flyback converter, comprising:
an output switch for isolating an output node for the flyback converter from a power lead in a data cable;
an output voltage calibration circuit confirmed to directly sense an output voltage for the flyback converter while the output switch is closed to provide a digital version of the output voltage and configured to adjust a reference voltage command responsive to a comparison of the digital version of the output voltage to a desired level for the output voltage;
an error amplifier configured to form an error signal responsive to a difference between a digitized feedback voltage and the reference voltage command; and
a power switch controller configured to modulate a cycling of a power switch transistor responsive to the error signal.

2. The circuit of claim 1, wherein the error amplifier is a digital circuit implemented by the power switch controller.

3. The circuit of claim 2, wherein the power switch controller is located on the primary winding side of the flyback converter.

4. The circuit of claim 3, wherein the power switch controller is further configured to form the feedback voltage by sampling an auxiliary winding voltage at a transformer reset time.

5. The circuit of claim 1, wherein the output voltage calibration circuit is further configured to directly sense the output voltage while the flyback converter is driving a known internal load.

6. The circuit of claim 5, wherein the output voltage calibration circuit includes a first adder configured to form a difference between the digital version of the output voltage and a default calibration reference to form a calibration error.

7. The circuit of claim 6, wherein the output voltage calibration circuit further includes a multiplier for multiplying the calibration error by a ratio of desired level for the output voltage to the default calibration reference to form an adjusted calibration error.

8. The circuit of claim 7, wherein the output voltage calibration circuit further includes a second adder configured to form a difference between the desired level for the output voltage and the adjusted calibration error to form a command for the adjusted reference voltage.

9. The circuit of claim 8, wherein the around-isolating channel comprises an optoisolator.

10. A method of calibrating a flyback converter operating in a constant-voltage mode of operation, comprising:
sensing an output voltage for the flyback converter to form a sensed output voltage while the flyback converter is isolated from external loads and is driving a own internal load;
comparing the sensed output voltage to a desired level for the output voltage to form a calibration error;
adjusting a reference voltage command responsive to the calibration error to form an adjusted reference voltage command;
transmitting the adjusted reference voltage command from a second win in side of the flyback converter to a primary winding side of the flyback converter;
comparing the adjusted reference voltage command to a digitized feedback voltage to form a digital error signal; and
modulating a cycling of a power switch in the flyback converter responsive to the digital error signal.

11. The method of claim 10, wherein the comparing of the sensed output voltage to the desired level for the output voltage is performed at a startup of the flyback converter.

12. The method of claim 10, further comprising charging a mobile device with the output voltage in a direct-charge mode of operation.

13. The method of claim 10, wherein the comparing of the sensed output voltage to the desired level for the output voltage to form the calibration error comprises subtracting a calibration default reference from the sensed output voltage to form the calibration error.

14. The method of claim 13, wherein the adjusting of the reference voltage command responsive to the calibration error comprises:
multiplying the calibration error by a ratio of the desired level for the output voltage and the calibration default reference to form an adjusted calibration error; and
subtracting the adjusted calibration error from the desired level for the output voltage to form the reference voltage command.

15. The method of claim 10, further comprising:
sensing an auxiliary winding voltage at a transformer rest time to form a sensed feedback voltage; and
digitizing the sensed feedback voltage to form the digitized feedback voltage.

* * * * *